United States Patent [19]

Richard

[11] 4,341,416
[45] Jul. 27, 1982

[54] ROLL-UP TRUCK COVER ASSEMBLY

[76] Inventor: Douglas B. Richard, 113 Richard Rd., Torrington, Conn. 06790

[21] Appl. No.: 142,674

[22] Filed: Apr. 22, 1980

[51] Int. Cl.³ .............................................. B60P 7/04
[52] U.S. Cl. ...................................... 296/98; 296/100
[58] Field of Search ................. 296/98, 111, 100, 112, 296/101, 113; 242/99; 160/67; 52/3, 5

[56] References Cited

U.S. PATENT DOCUMENTS 4,030,780  6/1977  Petretti ................................ 296/100
4,050,734  9/1977  Richard ........................... 296/100 X Primary Examiner—David M. Mitchell
Attorney, Agent, or Firm—McCormick, Paulding & Huber

[57] ABSTRACT

An improved roll-up truck cover assembly for dump trucks and the like having upstanding side and end walls defining an upwardly open body for receiving particulate material. The cover assembly comprises a flexible top cover substantially coextensive with the body cross section viewed from above and one end of the cover extends across and is attached to one end portion of the body. A take-up roll for the cover has a spring bias for rotation in a take-up direction and is mounted on a pair of arms at upper end portions of the latter. Lower end portions of the arms are pivotally attached externally at sides of the truck body to swing the take-up roll through a long shallow arc in a lengthwise traverse of the truck body. With the take-up roll at an opposite end portion of the body and the cover in closed position over the upwardly exposed opening in the body, a braking apparatus secures the take-up roll against inadvertent rotation whereby to maintain the cover in a taut condition over the opening.

11 Claims, 8 Drawing Figures

ROLL-UP TRUCK COVER ASSEMBLY

BACKGROUND OF THE INVENTION

Various roll-up truck covers are available to meet statutory requirements in the majority of the states. One type in wide use employs a stationary take-up roll mounted on a headboard adjacent a front wall of a truck body and from which the flexible cover is drawn rearwardly to a body covering position by a pair of swinging arms on opposite sides of the body. As the cover is drawn from the take-up roll, the diameter of the roll is of course reduced and when the truck is in motion air flows beneath the reduced diameter roll causing the cover to billow and to flap violently. Such covers are also characterized by poor sealing adjacent side walls of the truck body and particularly at the junction of the side walls and the headboard. The resultant billowing and violent flapping not only causes the loss of fine particulate material in transit but also severely reduces cover life, sharp and jagged particulate material in the truck body being impinged by the flapping cover and often marring and tearing the cover during opening and closing operations with the cover being drawn or dragged thereover.

An improved type of roll-up cover, disclosed more fully in my U.S. Pat. No. 4,050,734 entitled Roll-Up Truck Cover Assembly, granted on Sept. 27, 1977, has the take-up roll mounted on the swinging arms with a free end portion of the cover secured across a front end portion of the body. When the free end portion of the cover is secured at the front end of the body, it is possible to effect a careful attachment of the cover and to cover the areas at the junctions of side and end walls with short skirts or wings on the cover so as to prevent the entry of air beneath the cover when the truck is in motion. This results in a significant improvement in the billowing or flapping difficulty and particulate leakage and cover damage is also avoided, the dragging effect of the cover over sharp or jagged objects also being avoided with the take-up roll on the arms. There is, however, one remaining problem with regard to billowing and flapping of the cover in transit. With either of the aforesaid arrangements, there may be a tendency for the cover to inadvertently pull from the take-up roll resulting in a slack condition of the closed cover and in billowing and flapping. This inadvertent or unintended roll-out or draw-out of the cover from its take-up roll has remained an unsolved problem with both types of roll-up truck covers.

It is the general object of the present invention to provide a flexible roll-up truck cover assembly which exhibits a high degree of ease and convenience in use, which provided for tight closure of all areas of the truck body opening when in the closed position, and which is maintained in a relatively taut condition when closed to prevent the entry of air therebeneath both longitudinally and laterally and thereby to prevent particulate leakage, billowing and flapping, and to substantially enhance cover life.

A further object of the present invention resides in the provision of an improved roll-up truck cover assembly of the type mentioned which includes an automatically operable braking apparatus for preventing inadvertent or unintended rotation of the take-up roll when the cover is in the closed position over the opening in the truck body.

A still further object of the invention resides in the provision of a roll-up truck cover assembly of the type mentioned wherein the braking apparatus is of a desirably simple and yet highly effective construction and which may be readily adapted for use at either end of the truck body, installation of course depending upon the front or rear end mounting of the free end of the cover.

SUMMARY OF THE INVENTION

In fulfillment of the foregoing objects, an improved flexible roll-up truck cover assembly is provided with a flexible cover substantially coextensive with the opening of a truck body viewed from above and one end of the cover is attached across one end portion of the truck body. A take-up roll for the cover is mounted on swinging arms which provide for a shallow arcuate lengthwise traverse of the take-up roll above the truck body and the cover is thus moved between open and closed positions above the body opening. At the end of the truck body opposite the end to which the cover is attached, a braking apparatus is operable automatically to secure the take-up roll against inadvertent or unintended rotation which might result in draw off of the cover under the influence of aerodynamic forces during movement of the truck.

In preferred form, the braking apparatus comprises at least one rotatable means operatively associated with the take-up roll and a stop means for securing the rotatable means against rotation, the stop means being mounted on the truck body at its end portion opposite the attachment of the cover and being engageable with the rotatable means when the take-up roll is disposed at said opposite end portion with the cover in a closed position over the body. The rotatable means takes the form of at least one cylindrical flange rotatable with the take-up roll and having a circumferentially extending series of generally radially outwardly projecting teeth, and the stop means takes the form of a member mounted on the truck body and positioned to engage the teeth and prevent take-up roll rotation in the braking condition. Preferably, similar circumferentially toothed cylindrical flanges are provided at each end of the take-up roll and a pair of stop members are provided at opposite sides of the truck body respectively for cooperation with the flanges. The teeth on the flanges are inclined from the radial in the direction of take-up rotation of the take-up roll and resilient rubber-like pads are mounted on the stop members for engagement with the teeth. When the cover is attached at a front end portion of the truck body and the take-up roll is at a rear end portion with the cover closed, the stop members are of course located at the rear end portion adjacent the flange teeth. Conversely, if the cover is attached at the rear end of the truck body and the take-up roll is at the front end thereof with the cover closed, the stop members are mounted at the front end portion adjacent the flange teeth.

With the braking apparatus operative the cover is maintained in a taut condition over the opening in the truck body, side edge portions thereof are maintained in engagement with the top portions of the side walls of the body and lateral ingress of air with the truck in motion is avoided. Thus, the taut condition of the cover serves in two ways to limit billowing and flapping. The cover is less likely to billow and flap due to its taut condition and the maintenance of a sealing condition along its side edges tends to prevent air entry beneath the cover as might cause billowing and flapping. With the prior art cover assemblies and without provision for a taut cover the billowing and flapping phenomena was progressive. That is, billowing and flapping resulted in the lateral ingress of air beneath the cover and with the air stream flowing beneath the cover and with air turbulence, a further tendency to billow and flap was encountered, this in turn creating an additional tendency for the air to enter laterally. The present cover arrangement overcomes this phenomena by preventing incipient billowing and flapping.

DESCRIPTION OF PREFERRED EMBODIMENTS

Figure 1:
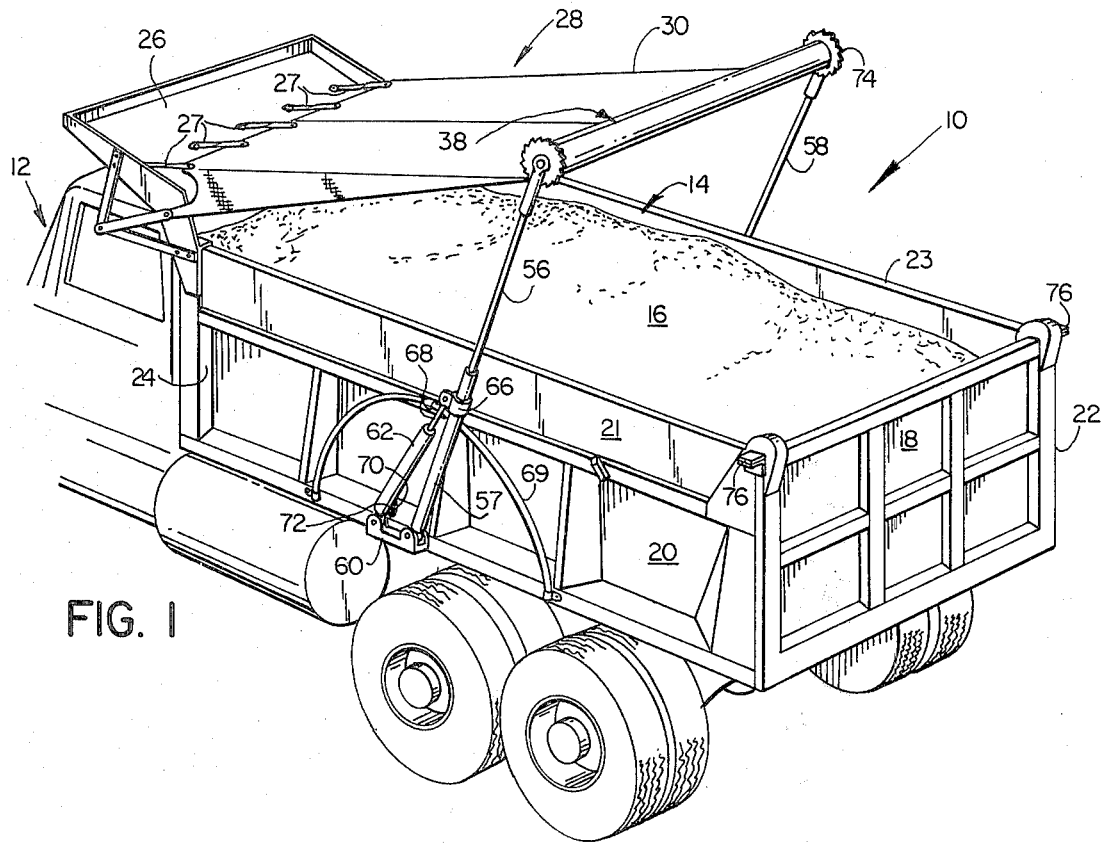
FIG. 1 is a perspective view of a dump truck with a roll-up cover assembly forming a first embodiment of the present invention, the cover being illustrated in a position of partial closure over the body opening.
Figure 2:
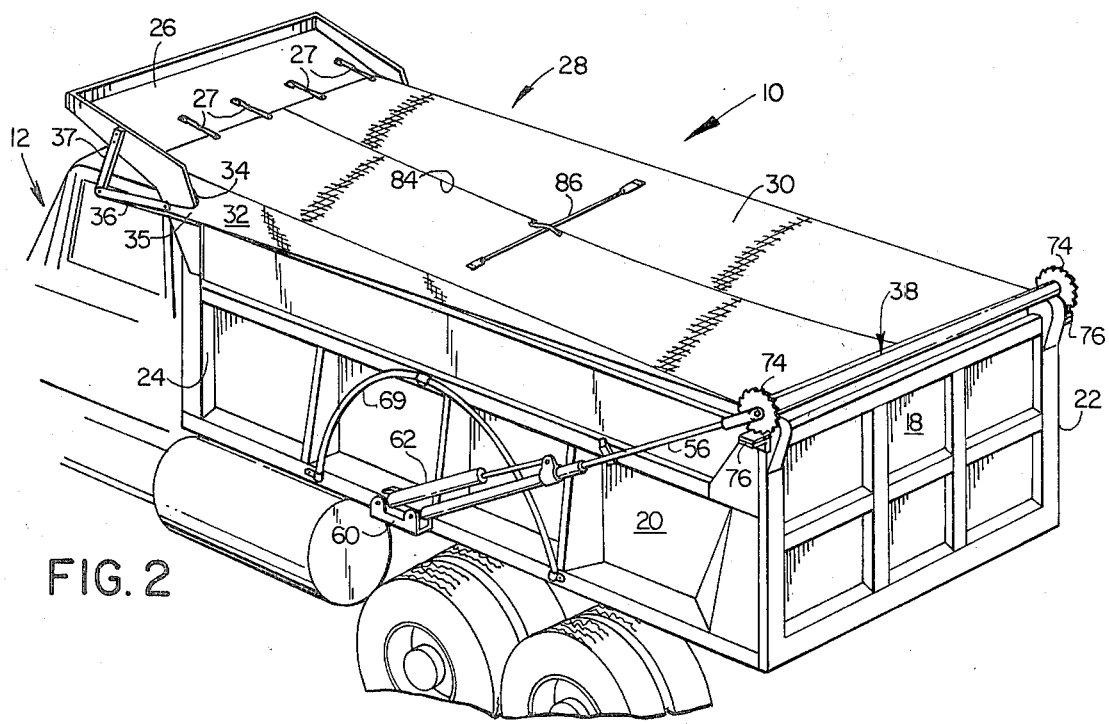
FIG. 2 is a perspective view similar to FIG. 1 showing the cover in a closed condition and the braking apparatus in an operative position.

Referring particularly to FIGS. 1 and 2, it will be observed that a truck indicated generally at 10 comprises a cab 12 and an upwardly open body 14 filled with particulate material 16. The truck is of the common dump variety with a rear end wall or hinged gate 18 which may be opened in a conventional manner, left and right hand side walls 20, 22 and a front wall 24. The side walls 20, 22 are formed with plank-like wood upper sections 21, 23 respectively and the front wall 24 has an upper and forwardly extending portion forming a conventional headboard 26. That is, the front wall 24 extends substantially above the side walls 20, 22 and then forwardly to form the headboard 26 which may be generally horizontal in attitude. As best illustrated in FIG. 1 and as is usually the case, vertical filling of the truck body may occur somewhat unevenly and in any event the load of particulate material may even extend or project somewhat above the walls of the body at certain locations. Whether or not the particulate material extends above the walls of the body, a flexible cover thereover may of course engage the same during opening and closing operations of the cover or if billowing and flapping of the cover occurs in the closed position. The particulate material carried by dump trucks of this type is often sharp or jagged in nature and the livelihood of damage to the cover will be readily apparent.

A cover assembly indicated generally at 28 forms a first embodiment of the present invention and comprises a flexible cover 30 which is substantially coextensive with the cross section of the body 14 when the latter is viewed from above. The cover 30 may be formed of canvas, vinyl or other flexible material and one end portion thereof extends across and is attached to one end portion of the truck body. In FIG. 1, the cover 30 is attached along a front edge portion to the headboard 26. A plurality of arms or links 27, 27 which may be flexible or rigid extend from the headboard 26 to the cover 30. The links 27, 27 are adapted to allow the front edge of the cover 30 to swing from open to closed positions and to accumulate or roll-up on a cover take-up roll. In the closed position of the cover 30 shown in FIG. 2, it will be observed that the links 27, 27 allow a front edge portion of the cover 30 to swing downwardly and to engage the headboard 26. Thus, closure is provided for and air is not permitted to enter beneath the cover 30. It should also be noted that the headboard 26 is inclined slightly upwardly and forwardly with an upstanding marginal flange so that the air stream flowing over the headboard is directed above the cover 30 and does not enter beneath its front edge to cause billowing or flapping.

In order that the cover 30 may completely enclose the front end portion of the body 14, wings or side skirts are provided on the cover as illustrated in FIGS. 1 and 2. More particularly, left and right hand skirts 32, 32 which may be identical, left hand only illustrated, are provided in a generally triangular shape with a narrow apex of the triangle extending rearwardly. The front wall 24 of the truck body extends substantially above the sidewalls 20, 22 and the side boards 21, 23 as mentioned and, accordingly, a short forwardly disposed and upwardly extending leg 34 of each triangular skirt 32 extends upwardly and in an arcuate configuration to close the area adjacent and above the junction of the body front and side walls. A forwardly extending elongated tab 35 is connected with a pivotal member 36 mounted on a suitable bracket 37 on the truck body. As will be apparent from an examination of FIGS. 1 and 2, the pivotal member 36 swings through an arc forwardly and rearwardly from the position shown in FIG. 2 with the cover closed to a substantially vertical position with the cover open. In the FIG. 2 position, the pivotal member 36 secures the side skirt 32 in its closed position to prevent particulate leakage and when the member reaches its substantially vertical position it allows the front edge portion of the cover 30 to be drawn upwardly and forwardly upon the headboard with the take-up roll in the forward or open position. Thus, vertical clearance is provided adjacent the top of the front wall 24 and the rear edge of the headboard 26 for the downward deposition of particulate material into the truck body.

Figure 3:
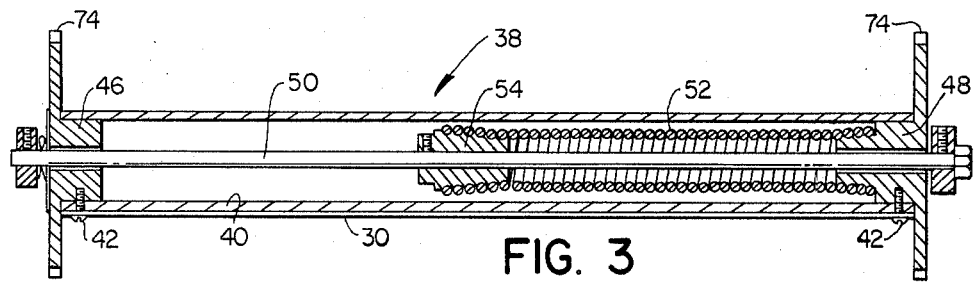
FIG. 3 is an enlarged longitudinal sectional view through a take-up roll.

A take-up roll for the flexible cover 30 is indicated generally at 38 and has an opposite or rear end portion of the cover 30 attached thereto. The take-up roll 38 includes biasing means tending to rotate the roll in a direction effecting a take-up operation of the cover. As best illustrated in FIG. 3, the cover 30 is bolted or screwed to an outer tubular portion 40 of the take-up roll as by means of suitable bolts or screws 42, 42. Left and right hand flange-hub sections 46, 48 are entered in opposite end portions of the tube 40. A shaft 50 extends through and is received for free rotation within suitable openings in the hubs 46, 48 and the aforesaid biasing means preferably takes the form of a coil spring 52 as shown. The spring 52 is fixed to the right hand hub 48 and to a spring seat or mount 54 secured to the shaft 50. The spring is so arranged as to cause the tube 40 and hubs 46, 48 to rotate in FIGS. 1 and 2 causing the cover 30 to assume a rolled-up or take-up position on the take-up roll 38. Thus, the cover 30 is at all times maintained and extended in a somewhat taut or slightly tensioned condition as the take-up roll 38 moves arcuately forwardly and/or rearwardly in a lengthwise traverse of the truck body 10.

Means for arcuately swinging the take-up roll 38 for lengthwise traverse of the truck body in one and an opposite direction preferably takes the form of first and second arms 56, 58 which may be identical and which are pivotally mounted respectively at lower end portions on the sides 20, 22 of the truck body. Upper end portions of the arms are fixed to the shaft 50. The mounting bracket 60 is shown on the left hand side of the body 20 and may be taken as representative of an identical mounting bracket on an opposite side of the truck body. Further, a two-part arm is preferably provided with a slidable and adjustable connection between the parts, a lower part 57 telescopically receiving an upper part 56. The arm 58 may be identical.

Further, and as best shown in FIGS. 1 and 2, a power operated means is preferably provided for urging the arms 56, 58 in one and opposite directions of arcuate movement. A fluid operated cylinder 62 is mounted on the bracket 60 and an adjustable bracket 66 on the arm portion 57 has a forward end portion of the cylinder piston rod 68 connected thereto. Fluid pressure lines 70, 72 extending from the cylinder 62 connect with a control unit which may be mounted in various locations on the truck, for example, within the cab for actuation by the operator of the truck. The arm 58 on the opposite side of the truck has an identical operating means so that the arms 56, 58 may be swung forwardly and rearwardly in unison respectively for opening and closing operations of the cover. A track 69 guides the arm portion 57 in its forward and rearward swinging movement and a similar track may be provided on an opposite side of the body for the arm 58 and a lower portion thereof.

Figure 4:
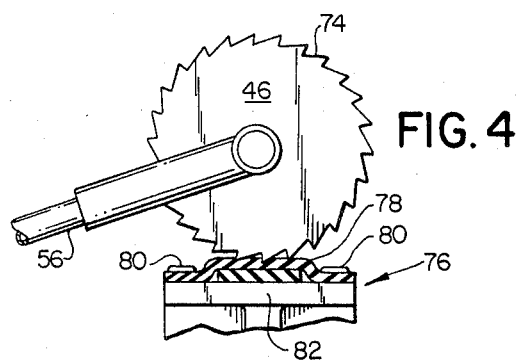
FIG. 4 is an enlarged side view of the braking apparatus of the present invention.

Returning now to FIG. 3, it will be observed that the hub-flanges 46, 48 comprise rotatable means operatively associated with the take-up roll and that the flanges each have a circumferentially extending series of generally radially outwardly projecting teeth 74, 74, FIG. 4. The flanges and their teeth 74, 74 form a part of an automatically operable braking apparatus and cooperate with a stop means for securing the flanges and the take-up roll against rotation. The stop means comprise members engageable by the teeth 74, 74 and operable to secure the flanges and the take-up roll 38 against rotation. A stop member 76 indicated generally in FIG. 4 has a resilient rubber-like pad 78 engageable with the teeth 74 on the flange of the hub flange member 46. The pad 78 may be secured by suitable bolts or screws 80, 80 to a bracket 82 forming a part of the stop member.

As best illustrated in FIGS. 1 and 2, the stop members 76, 76 are positioned at a rear portion of the truck body 10 and at opposite sides thereof so as to be engaged by the teeth 74,74 on the hub-flanges 46, 48 when the take-up roll 38 is in its rearwardmost position with the cover 30 in a closed position over the truck body.

The teeth 74, 74 may vary but preferably take a saw-toothed configuration as illustrated in FIG. 4. That is, the teeth are inclined from the radial in the direction of take-up rotation of the take-up roll 38. Thus, with the teeth 74, 74 engaging pads 78, 78 of the stop means 76, 76 the cover 30 is held in a slightly tensioned or taut condition in its closed position of FIG. 2. Unintended or accidental roll out of the cover is positively prevented and resultant billowing or flapping of the cover is eliminated.

In FIGS. 1 and 2, it will also be noted that the cover 30 includes a longitudinally extending pleat 84 which allows for a slight upward bulging of a central portion of the cover when a load of particulate material extends above the sides of the truck body. When the cover is in a flat condition as in FIG. 2 a laterally extending elasticized member 86 tends to maintain the cover in a taut condition laterally and prevents sagging of a central portion of the cover. This arrangement also tends to eliminate billowing and flapping of the cover.

Figure 5:
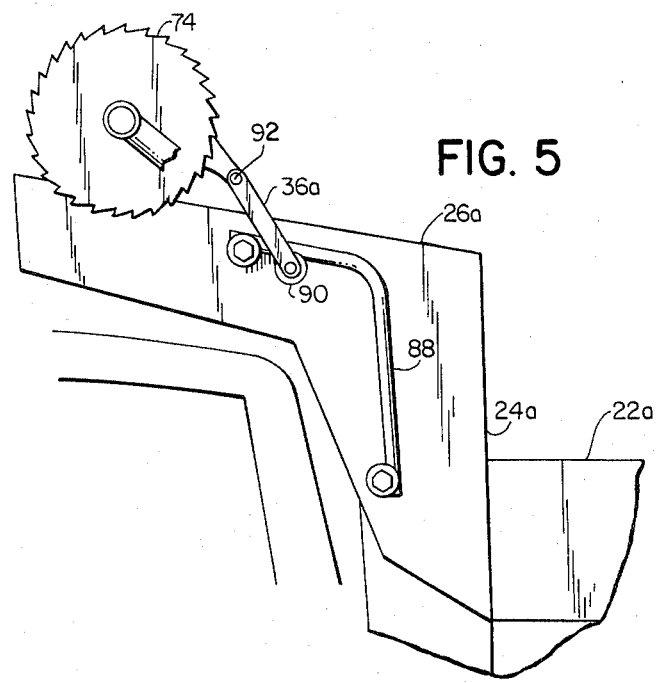
FIG. 5 is an enlarged side view showing the take-up roll and an alternative means for mounting the cover at a front end portion of a truck body, the cover being so mounted as to provide clearance for the dumping of material into the truck body and yet cover the front end portion thereof in the closed position.

In FIG. 5 an alternative arrangement of a pivot member 36a is illustrated. A small L-shaped track 88 is provided on a side of a headboard 26a and has an associated roller 90 at one end of the member 36a. The opposite end of the member 36a is pivotally attached to the cover at 92. Thus, when the cover is in the open position as shown the member 36a is allowed to move to the position illustrated with the roller 90 proceeding upwardly along the track 88. When the cover is moved to a closed position, the roller 90 proceeds rightwardly and downwardly along the track allowing the link 36a to arrange the cover in close proximity to the front wall 24a and the side wall 22a. This provides for closure of the area adjacent the junction of the walls 22a, 24a and prevents lateral entry of air beneath the cover as in the case of the member 36 of FIGS. 1 and 2. It will be apparent that a similar arrangement may be provided on an opposite side of the truck body for attachment of an opposite skirt on the cover.

Figure 6:
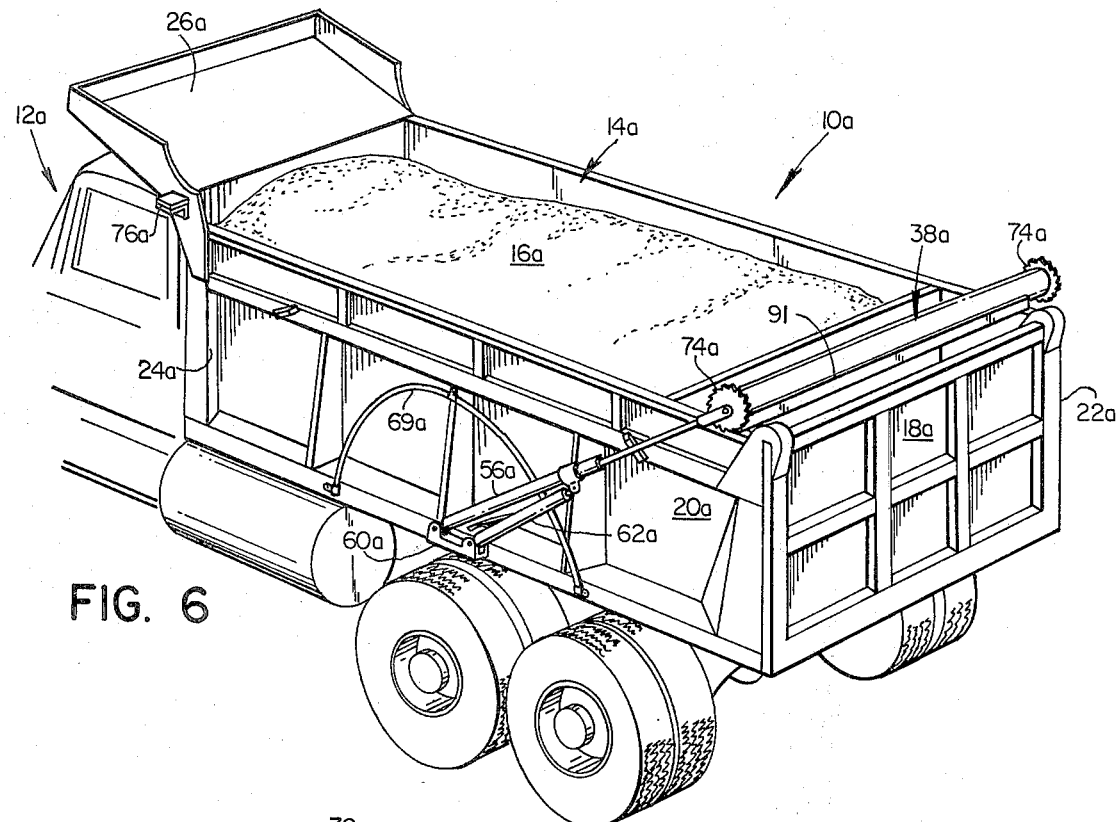
FIG. 6 is a perspective view of a dump truck with a cover assembly forming a second embodiment of the present invention, the cover being attached at a rear end portion of the truck body and the take-up roll and cover being illustrated in an open condition.
Figure 7:
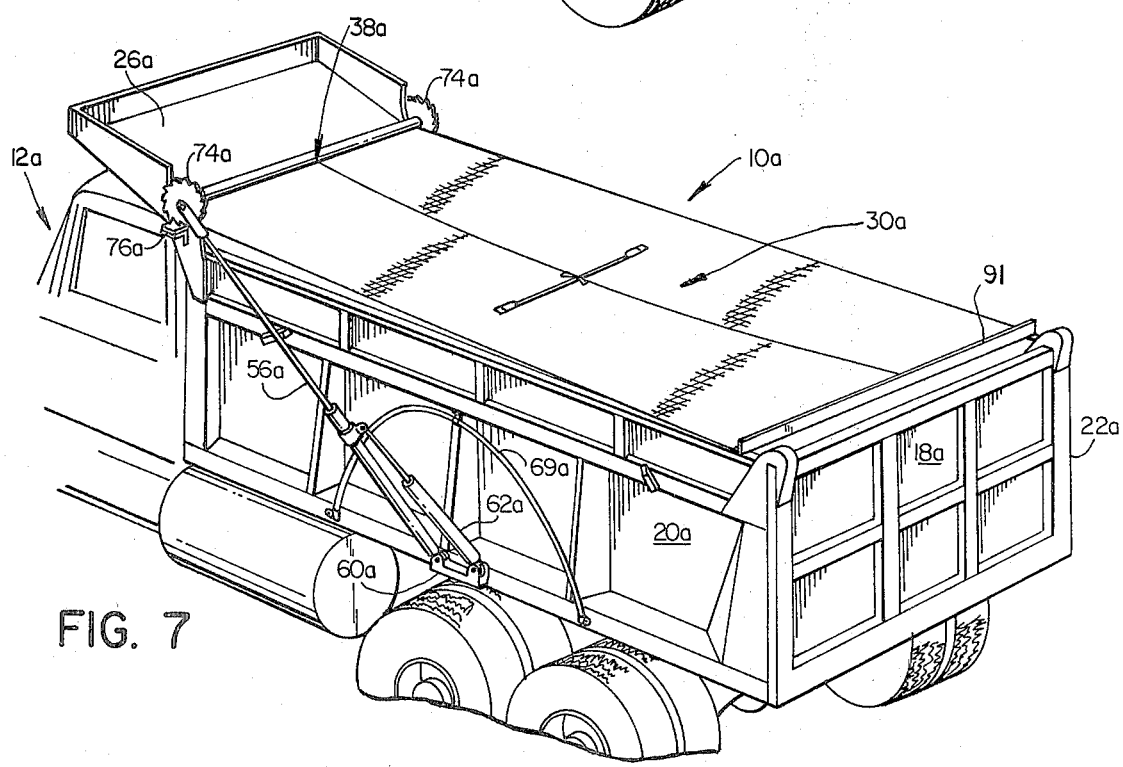
FIG. 7 is a perspective view similar to FIG. 6 but showing the take-up roll and cover in a closed condition above the body opening.

Referring now to FIGS. 6 and 7, it will be observed that a reverse orientation and operation of a cover assembly is provided for. That is, a cover 30a is attached at a rear end portion of a truck body 10a and to an angle member 91 mounted on the body. The cover 30a has an associated take-up roll 38a which swings from a rear position, FIG. 6, to a front position, FIG. 7, in a closing operation. The take-up roll is operated by arms 56a and 58a having associated cylinders as at 62a. The cover assembly and its operation may be similar to that described above in all respects except for its reverse orientation.

At a front end portion of the truck body 10a stop members 76a, 76a are provided for engagement with teeth 74a, 74a on flanges associated with the take-up roll. Thus, the braking apparatus as described above operates to secure the cover 30a in a taut condition when it is disposed above the truck body in its closed position.

Figure 8:
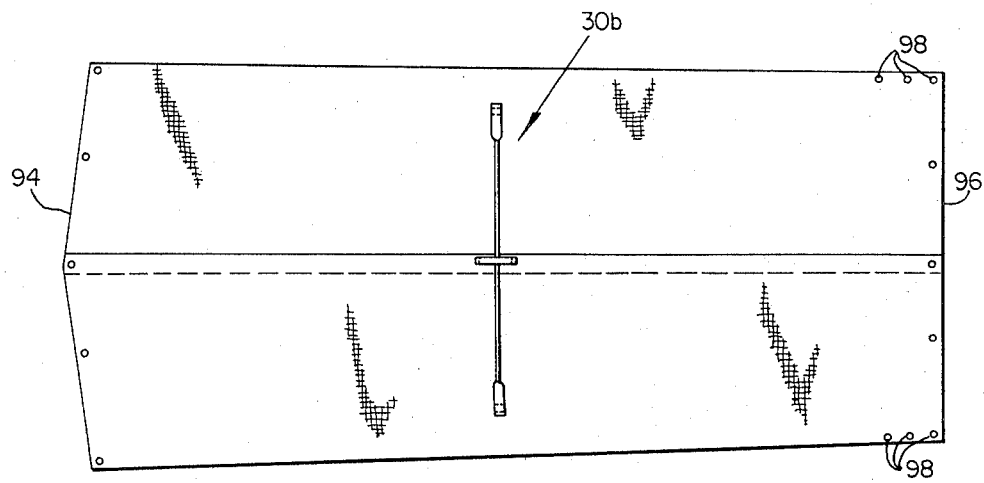
FIG. 8 is a top view of a typical flexible cover removed from its take-up roll.

In FIG. 8 a flexible cover 30b is illustrated and may be taken as representative of various designs for various truck body configurations. It will be noted that a front edge portion 94 of the cover angles outwardly and rearwardly from a central portion and that a rear edge portion 96 is substantially at right angles with the side edge portions. With the front edge portion constructed as shown, there is a tendency for the marginal or side edge portions of the cover 30b to be maintained under slightly greater tension than a central portion thereof.

This is found to be advantageous in preventing the lateral ingress of a stream of air beneath the cover when a truck is in motion with the cover in a closed position. Further, the provision of a plurality of small attachment openings or grommets 98, 98 in a rear portion of the cover provides for selective attachment of the cover and adjustment of the tension along the side edges thereof.

From the foregoing, it will be apparent that a cover assembly of improved design has been provided. The provision of several features for sealing of the cover against the ingress of an air stream therebeneath results in substantial improvement in the operation of the cover in a closed position with the truck in motion. Billowing and flapping of the cover is avoided and cover life is substantially extended.

I claim:

1. A roll-up truck cover assembly for dump trucks and the like having upstanding side and end walls defining an upwardly open generally rectangular body for receiving particulate material which may project upwardly beyond the sides of said body; said cover assembly comprising a generally rectangular flexible top cover substantially co-extensive with the body cross section viewed from above, said cover having one end portion attached to one end portion of the body to close the body adjacent one end wall and prevent particulate leakage, a take-up roll for said flexible cover having an opposite end portion of the cover attached thereto substantially across its width and having associated biasing means tending to rotate the roll in a take-up operation of the cover, a pair of similar arms pivotally mounted at lower end portions externally on opposite side walls of the truck body and having upper end portions connected with and rotatably supporting opposite end portions of said take-up roll, and operating means for swinging said arms and take-up roll from said one end portion of the body toward an opposite end portion for an arcuate end-to-end take-up roll traverse of the truck body placing the cover in a body covering position, the said direction being opposite to the direction which said biasing means tend to swing said arms while urging said cover in a take-up direction about said roll, said cover during both roll-out and take-up thus having substantially no horizontal component of movement with respect to particulate material in the truck body, and a braking apparatus associated with said take-up roll and operable at said opposite end portion of the truck body to secure the take-up roll against inadvertent rotation and to thereby hold the cover taut in its body covering position, said braking apparatus comprising circumferentially toothed rotatable means operatively associated with said take-up roll and stop means for securing the rotatable means against rotation, said stop means being mounted on said truck body at its said opposite end portion and engageable with said toothed rotatable means when said take-up roll is disposed at said opposite end portion with the cover in said body covering position.

2. A roll-up truck cover assembly as set forth in claim 1 wherein similar circumferentially toothed cylindrical flanges are provided at each end of the take-up roll, and wherein a pair of stop members are provided at opposite sides of the truck body respectively for cooperation with the flanges.

3. A roll-up truck cover assembly as set forth in claim 2 wherein each of said stop members has an associated resilient rubber-like pad for engagement with the teeth of the corresponding flange.

4. A roll-up truck cover assembly as set forth in claim 2 wherein said teeth on said flanges are inclined from the radial in the direction of take-up rotation of the take-up roll.

5. A roll-up truck cover assembly as set forth in claim 1 wherein said cover is attached at a front end portion of the body, and wherein the arms and take-up roll move from front-to-rear over the body in a body covering operation.

6. A roll-up truck cover assembly as set forth in claim 1 wherein said cover is attached at a rear end portion of the body, and wherein the arms and take-up roll move from rear-to-front over the body in a body covering operation.

7. A roll-up truck cover assembly as set forth in claim 1 wherein said body has a front end wall which projects upwardly beyond said side walls, and wherein said top cover is attached to said front end wall above said side walls and yet laterally closes the area adjacent and above the junction of said front and side walls.

8. A roll-up truck cover assembly as set forth in claim 7 wherein said top cover has depending side skirts disposed in close engagement with upwardly projecting side edge portions of said front wall adjacent the junction of said front and side walls.

9. A roll-up truck cover assembly as set forth in claim 8 wherein said side skirts and front wall have an associated movable connection means which serves to draw the side skirts into operative position as the top cover is extended over the truck body in a closing operation, said movable connection means serving also to draw the skirts upwardly and forwardly whereby to clear for loading the area extending along said front wall.

10. A roll-up truck cover assembly as set forth in claim 9 wherein said front wall has a forwardly projecting portion defining a headboard at a top edge portion thereof, wherein said attachment of said top cover to said front wall occurs forwardly of the vertical plane of said front wall on said headboard, and wherein means is provided for drawing said skirts forwardly of the front wall plane when the cover is open and thereby clearing for loading the area adjacent and along said front wall.

11. A roll-up truck cover assembly as set forth in claim 9 wherein said cover is provided with side skirts and wherein a pair of pivotally mounted members are operatively associated respectively with said side skirts, said pivotally operable members having end portions connected with the truck body whereby to pull said skirts to a tightly closed position at an area adjacent and above the junction of said front and side walls when said cover assembly is moved to a closed position, and said pivotally operable members serving also to permit said skirts to be drawn upwardly and forwardly to clear the area extending along said front wall when said cover is in the open position.

* * * * *